(12) United States Patent
Oshima et al.

(10) Patent No.: US 10,132,637 B2
(45) Date of Patent: Nov. 20, 2018

(54) VEHICULAR INFORMATION PROVISION SYSTEM, VEHICULAR INFORMATION PROVISION METHOD, AND PROGRAM

(71) Applicant: MITSUBISHI HEAVY INDUSTRIES MACHINERY SYSTEMS, LTD., Kobe-shi, Hyogo (JP)

(72) Inventors: Kyoko Oshima, Tokyo (JP); Ryota Hiura, Tokyo (JP); Masaaki Sato, Yokohama (JP); Kazunori Sugiura, Yokohama (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 14/915,205

(22) PCT Filed: Aug. 28, 2014

(86) PCT No.: PCT/JP2014/072521
§ 371 (c)(1),
(2) Date: Feb. 26, 2016

(87) PCT Pub. No.: WO2015/030092
PCT Pub. Date: Mar. 5, 2015

(65) Prior Publication Data
US 2016/0216121 A1    Jul. 28, 2016

(30) Foreign Application Priority Data

Aug. 30, 2013    (JP) ................................. 2013-180014

(51) Int. Cl.
*G01C 21/26*    (2006.01)
*G08G 1/01*    (2006.01)
(Continued)

(52) U.S. Cl.
CPC ............ *G01C 21/26* (2013.01); *B61L 15/009* (2013.01); *B61L 15/0027* (2013.01);
(Continued)

(58) Field of Classification Search
CPC ..... G01C 21/26; G01C 21/3679; H04L 67/18; H04L 67/12; G08G 1/0133;
(Continued)

(56) References Cited

U.S. PATENT DOCUMENTS 9,141,973 B2 *  9/2015  Mendoza ............... G09F 21/048
2009/0112723 A1 *  4/2009  Gottesman ......... G06Q 10/1093
705/14.4
(Continued)

FOREIGN PATENT DOCUMENTS

JP          5-6950 U      1/1993
JP       11-291909 A    10/1999
(Continued)

OTHER PUBLICATIONS

Machine Translation of JP 2004-348545 retrieved from Espacenet on Oct. 2, 2016.*
(Continued)

*Primary Examiner* — Thomas Ingram
(74) *Attorney, Agent, or Firm* — Kanesaka Berner and Partners LLP

(57) ABSTRACT

A vehicular information provision system for providing information to at least one of the inside and outside of a traveling vehicle includes a server configured to associate output data outputted from the vehicle with event identification information for identifying a predetermined event depending on a position on a map and hold the associated output data and event identification information, an on-board unit which is to be mounted on the vehicle and configured to specify a vehicle position based on positioning
(Continued)

information acquired by a satellite-positioning system and pre-acquired map information and output the event identification information correlating with the specified vehicle position, and an information provision apparatus which is to be mounted on the vehicle and configured to acquire the output data correlating with the event identification information acquired from the on-board unit from the server and cause the output data to be outputted from an output unit.

10 Claims, 7 Drawing Sheets

(51) Int. Cl.
*G01S 19/13* (2010.01)
*H04L 29/08* (2006.01)
*B61L 15/00* (2006.01)
*B61L 25/02* (2006.01)
*G08G 1/0967* (2006.01)
*G01C 21/36* (2006.01)
*G09F 21/04* (2006.01)
*G06Q 30/02* (2012.01)
*G06F 19/00* (2018.01)
*G08G 1/127* (2006.01)
*G09F 19/00* (2006.01)

(52) U.S. Cl.
CPC ........... *B61L 15/0072* (2013.01); *B61L 25/02* (2013.01); *B61L 25/025* (2013.01); *G01C 21/3679* (2013.01); *G01S 19/13* (2013.01); *G06Q 30/02* (2013.01); *G08G 1/0133* (2013.01); *G08G 1/096741* (2013.01); *G08G 1/096775* (2013.01); *G08G 1/127* (2013.01); *G09F 19/00* (2013.01); *G09F 21/04* (2013.01); *H04L 67/12* (2013.01); *H04L 67/18* (2013.01); *B61L 2205/04* (2013.01)

(58) Field of Classification Search
CPC ....... G08G 1/096775; G08G 1/096741; G08G 1/127; G01S 19/13; B61L 25/025; B61L 15/0072; B61L 15/0027; B61L 15/009; B61L 25/02; B61L 2205/04; G06Q 30/02
See application file for complete search history.

(56) References Cited

U.S. PATENT DOCUMENTS

| | | | | |
|---|---|---|---|---|
| 2013/0246181 | A1* | 9/2013 | Lobsenz | G09F 21/04 705/14.63 |
| 2013/0268148 | A1* | 10/2013 | Kondo | B60N 5/00 701/19 |

FOREIGN PATENT DOCUMENTS

| | | |
|---|---|---|
| JP | 2004-347952 A | 12/2004 |
| JP | 2004-348545 A | 12/2004 |
| JP | 2008-21030 A | 1/2008 |
| WO | 2012/086000 A1 | 6/2012 |

OTHER PUBLICATIONS

Machine Translation of JP H05-6950(U) retrieved from JPO on Oct. 2, 2016.*
International Search Report in PCT/JP2014/072521, dated Sep. 30, 2014.
Written Opinion in PCT/JP2014/072521, dated Sep. 30, 2014.

* cited by examiner

FIG. 3

EXAMPLE OF EVENT TABLE

| POSITIONAL INFORMATION | EVENT IDENTIFICATION INFORMATION |
|---|---|
| P1 | 001 |
| P1 | 101 |
| P1 | 103 |
| P1 | 202 |
| P2 | ... |
| P2 | ... |
| ... | ... |

FIG. 4

EXAMPLE OF OUTPUT DATA TABLE

| EVENT IDENTIFICATION INFORMATION | OUTPUT TIME CONDITION | WEATHER CONDITION | CONGESTION CONDITION | OUTPUT DATA | PRIORITY INFORMATION | LIMITED VIBRATION CONDITION | LIMITED SPEED CONDITION |
|---|---|---|---|---|---|---|---|
| 001 | — | — | — | BUMP WARNING | HIGHEST PRIORITY | THRESHOLD VALUE 1 | 20 km PER HOUR |
| 002 | — | — | — | SHARP CURVE WARNING | HIGHEST PRIORITY | THRESHOLD VALUE 2 | 20 km PER HOUR |
| 003 | — | — | — | STATION PASS NOTIFICATION | HIGHEST PRIORITY | — | — |
| ... | ... | ... | ... | ... | ... | ... | ... |
| 101 | — | RAINY | — | CORPORATE ADVERTISEMENT 1 | PRIORITY HIGHER THAN THAT OF UNIVERSITY ADVERTISEMENT | — | — |
| 102 | — | CLEAR | — | CORPORATE ADVERTISEMENT 2 | PRIORITY HIGHER THAN THAT OF CORPORATE ADVERTISEMENT 1 | — | — |
| 103 | 6:00 TO 12:00 AM | TEMPERATURE OF 30°C OR MORE | — | CORPORATE ADVERTISEMENT 3 | PRIORITY HIGHER THAN THAT OF UNIVERSITY ADVERTISEMENT | — | — |
| ... | ... | ... | ... | ... | ... | ... | ... |
| 201 | 1:00 TO 5:00 PM | — | — | UNIVERSITY ADVERTISEMENT 1 | — | — | — |
| 202 | 6:00 TO 12:00 AM | — | — | UNIVERSITY ADVERTISEMENT 2 | — | — | — |
| 203 | — | — | — | UNIVERSITY ADVERTISEMENT 3 | — | — | — |
| ... | ... | ... | ... | ... | ... | ... | ... |

VEHICULAR INFORMATION PROVISION SYSTEM, VEHICULAR INFORMATION PROVISION METHOD, AND PROGRAM

RELATED APPLICATIONS

The present application is a National Phase of PCT/JP2014/072521, filed Aug. 28, 2014, and claims priority based on Japanese Patent Application No. 2013-180014, filed on Aug. 30, 2013.

TECHNICAL FIELD

The present invention relates to a vehicular information provision system, a vehicular information provision method, and a program for providing information to at least one of the inside and outside of a traveling vehicle.

BACKGROUND ART

As an advertisement distribution system for displaying an advertisement on a display apparatus mounted in a bus, there is an advertisement distribution system having an on-board unit for acquiring current operation positional information and current time information and providing an advertisement matching the acquired current operation positional information and current time information inside the vehicle (for example, see Patent Literature 1).

The on-board unit disclosed in Patent Literature 1 can update advertisement data embedded in its own storage unit based on advertisement data distributed from a server and display latest advertisement data.

CITATION LIST

Patent Literature

[Patent Literature 1]
Japanese Unexamined Patent Application, First Publication No. 2004-347952

SUMMARY OF INVENTION

Technical Problem

However, because a car navigation function mounted in a general vehicle is not necessary in a circular bus which travels a determined route, an on-board unit with a simple configuration is mounted in many cases. Specifically, an on-board unit mounted in such a circular bus has functions, for example, such as a function of specifying a position of the vehicle based on a signal transmitted from a satellite, a function of measuring a speed or vibration of the vehicle based on a detection signal of an acceleration sensor or the like, and does not have a function of displaying a map image indicating a current position of the vehicle on a display unit in many cases.

Thus, it is difficult to apply a system, in which the on-board unit selects an advertisement matching current traveling positional information and current time information and outputs the selected advertisement from a display apparatus or a speaker as in the system disclosed in Patent Literature 1, to a bus in which a simple on-board unit is provided. In order to apply the system, it is necessary to mount a highly functional on-board unit for all buses and there is a problem in that significant cost is required.

The present invention provides a vehicular information provision system, a vehicular information provision method, and a program capable of (i) reducing a processing load on an on-board unit and (ii) rapidly updating sequentially added provision information to provide the updated information to a vehicle.

Solution to Problem

According to a first aspect of the present invention, a vehicular information provision system for providing information to at least one of the inside and outside of a traveling vehicle, the vehicular information provision system includes: a server configured to associate output data outputted from the vehicle and event identification information for identifying a predetermined event depending on a position on a map and hold the associated output data and event identification information; an on-board unit which is to be mounted on the vehicle and configured to specify a vehicle position based on positioning information acquired by a satellite-positioning system and pre-acquired map information and output the event identification information correlating with the specified vehicle position; and an information provision apparatus which is to be mounted on the vehicle and configured to acquire the output data correlating with the event identification information acquired from the on-board unit from the server and cause the output data to be outputted from an output unit.

The information provision apparatus may further include an output control unit configured to determine an output mode of the output data correlating with the event identification information acquired from the on-board unit based on information indicating at least one of a current vehicle environment and a current traveling state.

The information provision apparatus may further include a congestion situation determination unit configured to determine a congestion situation within the vehicle based on congestion information about a degree of congestion within the vehicle, and the output control unit of the information provision apparatus may emphasize an output mode of the output data when the inside of the vehicle is congested more than an output mode of the output data when the inside of the vehicle is not congested based on a determination result of the congestion situation.

The output control unit of the information provision apparatus may determine priorities between the output data associated with the plurality of pieces of event identification information acquired from the on-board unit based on predetermined priority information in association with the event identification information and emphasize an output mode of the output data having a high priority more than an output mode of the output data having a low priority.

The output control unit of the information provision apparatus may limit an output of the output data correlating with the event identification information having a lower priority than other event identification information among the event identification information acquired from the on-board unit based on priority information predetermined in association with the event identification information.

The output control unit of the information provision apparatus may compare an output condition predetermined in association with the event identification information with the current vehicle environment or the current traveling state and cause the output data correlating with the remaining event identification information obtained by excluding the event identification information for which the current vehicle environment or the current traveling state does not satisfy the output condition among the event identification information acquired from the on-board unit to be outputted from the output unit.

The output data may include at least one of image data and sound data.

According to a second aspect of the present invention, a vehicular information provision method for providing information to at least one of the inside and outside of a traveling vehicle, the vehicular information provision method includes: specifying, by an on-board unit mounted on the vehicle, a vehicle position based on positioning information acquired by a satellite-positioning system and pre-acquired map information and output the event identification information correlating with the specified vehicle position; and acquiring, by an information provision apparatus mounted on the vehicle, output data correlating with the event identification information acquired from the on-board unit from a server, which associates the output data outputted from the vehicle and event identification information for identifying a predetermined event depending on a position on a map and holds the associated output data and event identification information, and causing the output data to be outputted from an output unit.

According to a third aspect of the present invention, a program is for causing a computer, mounted in a vehicle, for providing information to at least one of the inside and outside of a traveling vehicle to execute: a procedure of acquiring event identification information correlating with a vehicle position specified based on positioning information acquired by a satellite-positioning system and pre-acquired map information from an on-board unit; and a procedure of acquiring output data correlating with the event identification information acquired from the on-board unit from a server, which associates output data outputted from the vehicle and event identification information for identifying a predetermined event depending on a position on a map and holds the associated output data and event identification information, and causing the output data to be outputted from an output unit.

Advantageous Effects of Invention

According to the vehicular information provision system, the vehicular information provision method, and the program described above, it is possible to reduce a processing load on an on-board unit and rapidly update sequentially added provision information to provide the updated information in a vehicle.

BRIEF DESCRIPTION OF DRAWINGS

FIG. 3 is a diagram illustrating an example of an event table registered in an on-board unit according to an embodiment of the present invention.

FIG. 4 is a diagram illustrating an example of an output data table registered in a vehicular information provision apparatus according to an embodiment of the present invention.

DESCRIPTION OF EMBODIMENTS

Figure 1:
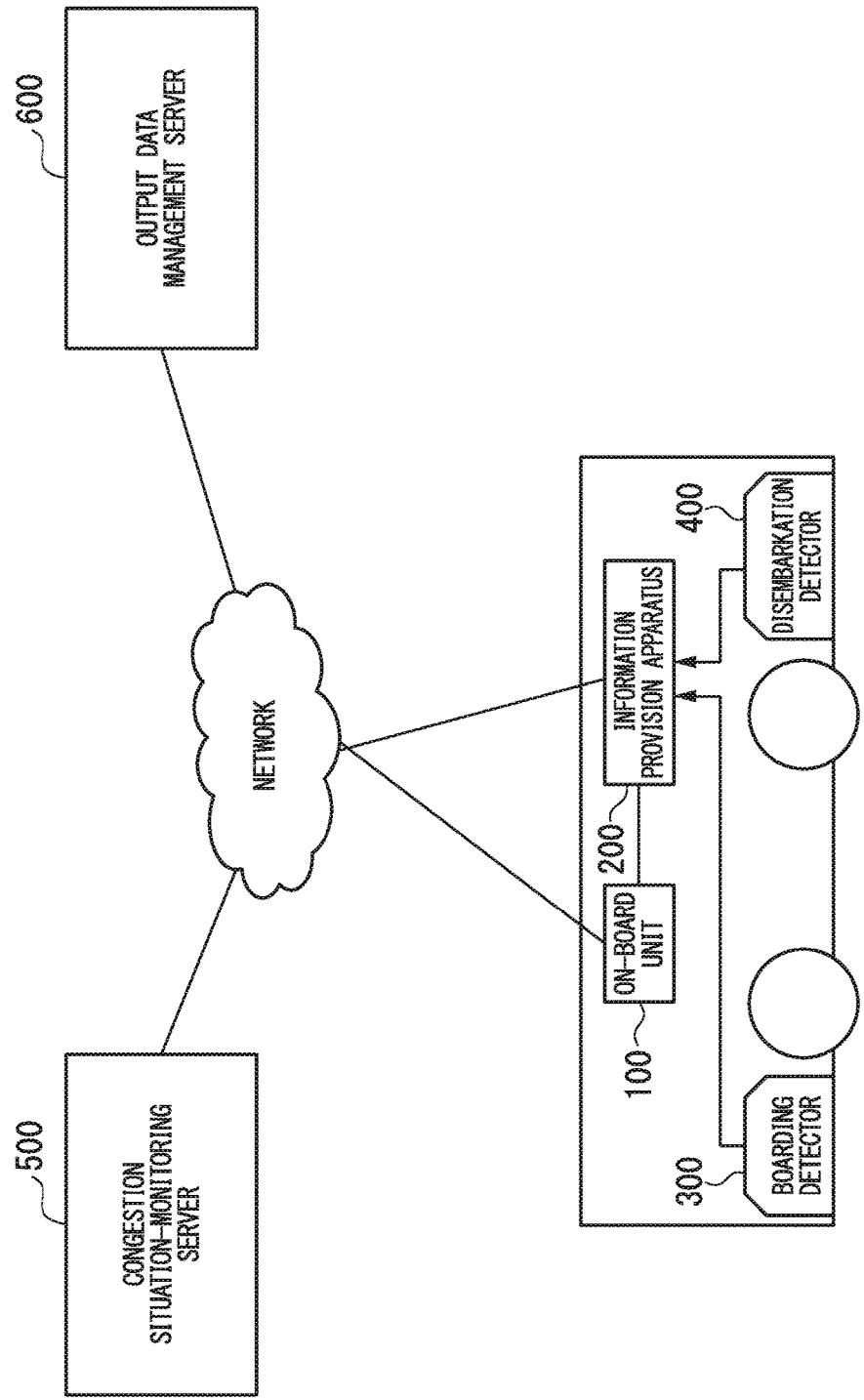
FIG. 1 is a schematic diagram illustrating an example of a vehicular information provision system according to an embodiment of the present invention.

FIG. 1 is a schematic diagram illustrating an example of a vehicular information provision system according to an embodiment of the present invention.

As illustrated in FIG. 1, the vehicular information provision system according to the embodiment of the present invention is a vehicular information provision system for providing information to at least one of the inside and outside of a traveling vehicle, and includes an on-board unit 100, an information provision apparatus 200, a boarding detector 300, a disembarkation detector 400, a congestion situation-monitoring server 500, and an output data management server 600. In the present embodiment, the on-board unit 100, the information provision apparatus 200, the boarding detector 300, and the disembarkation detector 400 are mounted in the vehicle and the congestion situation-monitoring server 500 and the output data management server 600 are installed outside the vehicle. Also, the present embodiment is not limited thereto, and the congestion situation-monitoring server 500 and the output data management server 600 may also be configured to be mounted in the vehicle. In the present embodiment, the vehicle is, for example, a circular bus for traveling on site at a university, a factory, or the like. However, the present embodiment is not limited thereto, and the vehicle may be a private car, a taxi, a truck, a train, a monorail, or the like.

In the vehicular information provision system according to the present embodiment, event identification information for identifying a predetermined event depending on a position on a map is used commonly between apparatuses. The event is to provide at least information determined depending on the position on the map to the vehicle. The vehicular information provision system according to the present embodiment is not limited to the information determined depending on the position on the map, and information determined depending on a current vehicle environment (for example, a current time, a temperature or weather of a place in which the vehicle travels, or a congestion situation within the vehicle), a current traveling state (for example, a traveling speed of the vehicle or an amount of vibration within the vehicle), or the like may be provided to the vehicle using the event identification information in addition to the position on the map.

The boarding detector 300 detects the passage through an entrance and outputs information indicating the number of detections. In other words, the boarding detector 300 detects persons boarding through the entrance and outputs information indicating the counted number of passengers on board (hereinafter, on-board passenger count information).

The disembarkation detector 400 detects the passage through an exit and outputs information indicating the number of detections. In other words, the disembarkation detector 400 detects persons disembarking through the exit and outputs information indicating the counted number of disembarking passengers (hereinafter, disembarking passenger count information).

The boarding detector 300 and the disembarkation detector 400, for example, transmit the on-board passenger count information and the disembarking passenger count information to the congestion situation-monitoring server 500 via the information provision apparatus 200. Also, the present embodiment is not limited thereto, and the boarding detector 300 and the disembarkation detector 400 may directly transmit the on-board passenger count information and the disembarking passenger count information to the congestion situation-monitoring server 500 via the network.

Figure 2:
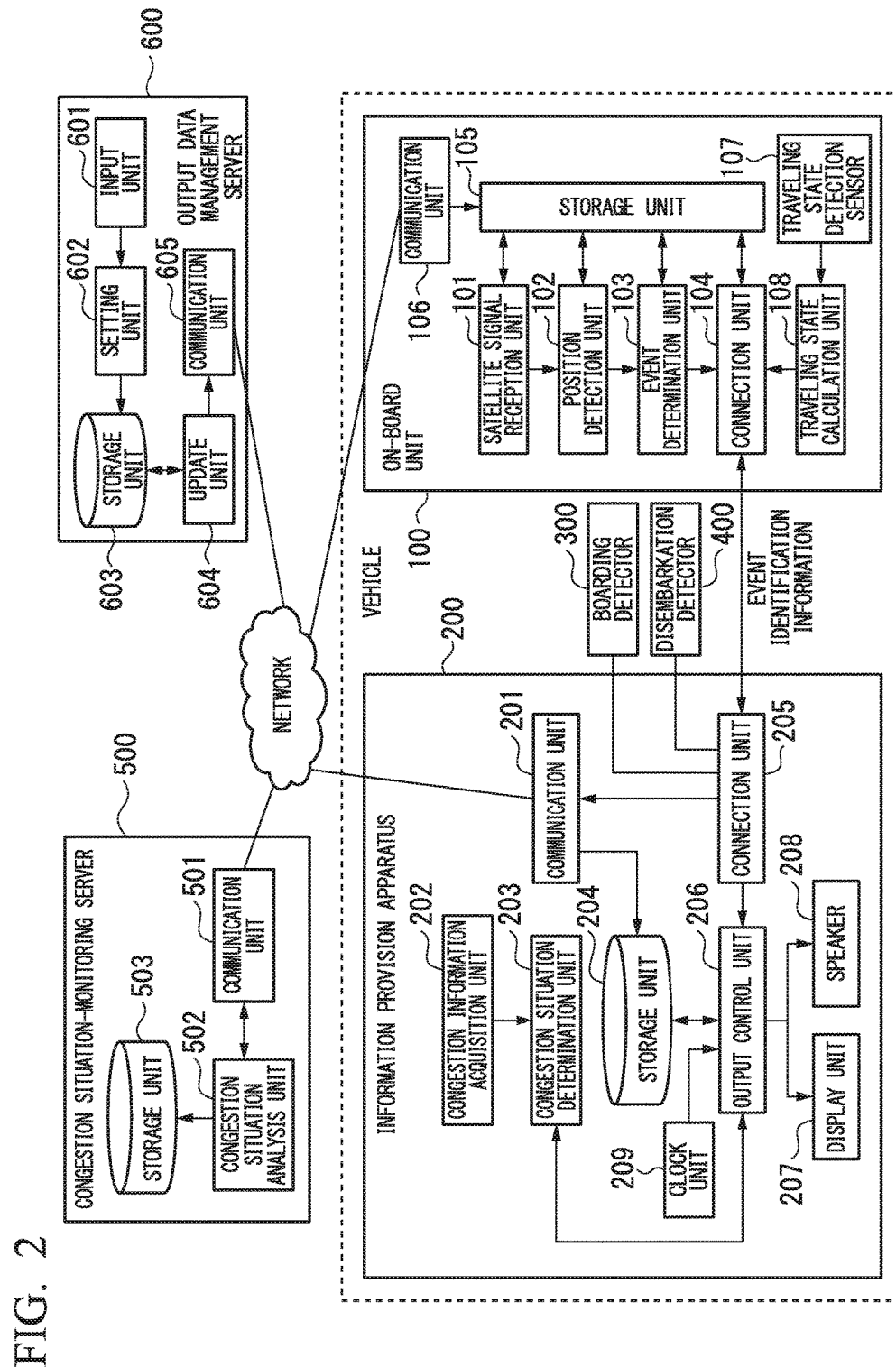
FIG. 2 is a block diagram illustrating a configuration example of components included in the vehicular information provision system according to an embodiment of the present invention.

Next, an example of a configuration of components included in the vehicular information provision system will be described with reference to FIG. 2. FIG. 2 is a block diagram illustrating a configuration example of components included in the vehicular information provision system according to the present embodiment.

The on-board unit 100 includes a satellite signal reception unit 101, a position detection unit 102, an event determination unit 103, a connection unit 104, a storage unit 105, a communication unit 106, a traveling state detection sensor 107, and a traveling state calculation unit 108.

The satellite signal reception unit 101 receives a signal transmitted from a satellite by a global navigation satellite system (GNSS) and outputs positioning information. In other words, the satellite signal reception unit 101 outputs the positioning information acquired by a satellite positioning system.

The position detection unit 102 specifies a current position (hereinafter also referred to as vehicle position) of the on-board unit 100 based on the positioning information outputted from the satellite signal reception unit 101 and pre-acquired map information. This position detection unit 102 specifies the vehicle position on the map, for example, using the technology of map matching. It is preferable for the position detection unit 102 to have detection precision to an extent to which it is possible to specify a traveling lane among a plurality of lanes on the map.

The event determination unit 103 acquires event identification information correlating with the vehicle position based on the vehicle position specified by the position detection unit 102 with reference to the storage unit 105. When the number of pieces of event identification information correlating with the vehicle position is two or more, the event determination unit 103 acquires the plurality of pieces of event identification information.

The connection unit 104 is connected to the information provision apparatus 200, for example, by wire, and outputs the event identification information acquired by the event determination unit 103 to the information provision apparatus 200.

The storage unit 105 includes an event table in which the positional information and the event identification information are associated. The event table will be described below with reference to FIG. 3. The storage unit 105 stores a unique on-board unit identifier (ID) (on-board unit identification information) allocated to each on-board unit.

The communication unit 106 is connected to the output data management server 600 via the network. This communication unit 106 receives information in which the event identification information and the positional information are associated from the output data management server 600 and stores the received information in the storage unit 105. The communication unit 106 may be a communication unit configured to perform short-range communication with a roadside unit (not illustrated) provided on the side of a road on which the vehicle travels. In this case, the communication unit 106 acquires the event identification information and the positional information from the output data management server 600 connected to a wide area network via the roadside unit (not illustrated). The on-board unit 100 may not have the communication unit 106 and may be configured not to be connected to the network. In this case, the on-board unit 100 acquires the event identification information and the positional information from the output data management server 600 connected to the wide area network via the information provision apparatus 200.

The traveling state detection sensor 107, for example, includes an acceleration sensor, an angular speed sensor, etc. and outputs information indicating a detected speed, acceleration, and an angular speed to the traveling state calculation unit 108.

The traveling state calculation unit 108 calculates a traveling speed of the vehicle and an amount of vibration of the vehicle based on information indicating the speed, the acceleration, and the angular speed detected by the traveling state detection sensor 107, and outputs a calculation result (hereinafter referred to as traveling state information) to the information provision apparatus 200 via the connection unit 104.

The information provision apparatus 200 includes a communication unit 201, a congestion information acquisition unit 202, a congestion situation determination unit 203, a storage unit 204, a connection unit 205, an output control unit 206, a display unit 207, a speaker 208, and a clock unit 209. A configuration including the display unit 207 and the speaker 208 is referred to as an output unit.

The communication unit 201 is connected to the congestion situation-monitoring server 500 and the output data management server 600 via the network. This communication unit 201 outputs the on-board passenger count information and the disembarking passenger count information input to the communication unit 201 by the connection unit 205 to the congestion situation-monitoring server 500. The communication unit 201 receives information in which event identification information, output data, an output condition, priority information, etc. are associated from the output data management server 600 and stores the received information in the storage unit 204. The communication unit 201 receives information indicating a congestion situation received from the congestion situation-monitoring server 500 via the network and stores the received information in the storage unit 204. The communication unit 201 receives weather information indicating weather (cloudy, rainy, or clear) or a temperature of a place in which the vehicle travels from an external server (not illustrated) via the network and stores the received weather information in the storage unit 204. The communication unit 201 may transmit positional information indicating a vehicle position input to the communication unit 201 by the on-board unit 100 to the external server (not illustrated) in order to acquire the weather information correlating with the vehicle position.

The congestion information acquisition unit 202 acquires information about a degree of congestion (hereinafter referred to as congestion information) from the congestion situation-monitoring server 500 and outputs the acquired information to the congestion situation determination unit 203.

The congestion situation determination unit 203 determines a congestion situation in the vehicle based on the congestion information input to the congestion situation determination unit 203 by the congestion information acquisition unit 202.

The storage unit 204 includes an output data table in which event identification information, output data, an output condition (for example, an output time condition, a weather condition, a priority condition, a limited vibration condition, or a limited speed condition), and priority information are associated. The output data table will be described below with reference to FIG. 4. The storage unit 204 stores a unique information provision apparatus ID (information provision apparatus identification information) allocated to each information provision apparatus 200.

The connection unit 205 is connected to the on-board unit 100, for example, by wire, receives an input of event identification information from the on-board unit 100, and outputs the input event identification information to the output control unit 206.

The output control unit 206 determines an output mode of output data correlating with the event identification information acquired from the on-board unit 100 based on information indicating at least one of a current vehicle environment (for example, a current time, a temperature or weather of a place in which the vehicle travels, or a congestion situation within the vehicle) and a current traveling state (for example, a traveling speed of the vehicle or an amount of vibration within the vehicle). The output mode, for example, includes the number of pieces of output data displayed on the display unit 207, screen splitting of a plurality of pieces of output data displayed on the display unit 207, a display timing, a display time, a size or thickness of text displayed on the display unit 207, the order in which sound is outputted from the speaker 208, an output timing, an output time, a volume, etc. Specifically, the output control unit 206 determines an output mode such as a mode in which a plurality of images are superimposed and displayed, a mode in which the plurality of images are continuously displayed at predetermined time intervals, a mode in which the plurality of images are displayed on the same screen, and a mode in which the plurality of images are displayed in the same size or different sizes based on information indicating at least one of the current vehicle environment and the current traveling state.

For example, the output control unit 206 determines the output mode of the output data correlating with the event identification information acquired from the on-board unit 100 based on the determination result of the congestion situation determination unit 203. Specifically, when the number of passengers on board the vehicle indicated by the input congestion information exceeds a predetermined threshold value, the congestion situation determination unit 203 determines that the inside of the vehicle is congested. On the other hand, when the number of passengers on board the vehicle indicated by the input congestion information is less than the predetermined threshold value, the congestion situation determination unit 203 determines that the inside of the vehicle is not congested. When the congestion situation determination unit 203 determines that the inside of the vehicle is congested, the output control unit 206 causes the output data to be outputted from the output unit (the display unit 207 and the speaker 208) in a predetermined output mode for congested state. The output mode for the congested state can be arbitrarily set, and, for example, a process of increasing a size of text within a display image or a process of increasing a volume of sound to be outputted is set. As an output mode for non-congested state, preventing a process of enlarging the text or increasing the volume of the sound from being performed is set. That is, the output control unit 206 emphasizes the output mode of the output data when the inside of the vehicle is congested more than the output mode of the output data when the inside of the vehicle is not congested.

The output mode for times of congestion may be set depending on the number of passengers on board the vehicle. For example, a plurality of threshold values for the number of passengers on board the vehicle are set at 20 and 30. When the number of passengers on board the vehicle is less than 20, the output mode for the non-congested state is set as the output mode. When the number of passengers on board is greater than or equal to 20 and less than 30, a mode in which the process of increasing the size of the text is performed is set as the output mode for the congested state. When the number of persons within the vehicle is greater than or equal to 30, a process of increasing the volume of sound is set to be performed in addition to the process of increasing the size of the text as the output mode for the congested state. That is, the output control unit 206 strengthens the emphasis of the output mode of the output data depending on an increase in a degree of congestion within the vehicle.

In addition, the output control unit 206 determines priorities between output data associated with a plurality of pieces of event identification information acquired from the on-board unit 100 based on priority information associated with the output data in the output data table. The output control unit 206 emphasizes the output mode of the output data having a high priority more than the output mode of the output data having a low priority based on a determination result of a priority. The output control unit 206 selects output data having a higher priority than other output data based on the determination result of the priority, excludes output data having a lower priority than other output data, and sets the number of pieces of output data after the selection to a value less than an output limit number. The output control unit 206 causes the selected output data to be outputted from the display unit 207 or the speaker 208. The output limit number, for example, is predetermined depending on a screen size of the display unit 207 and is the maximum number of pieces of output data capable of being simultaneously displayed on the display unit 207.

This output control unit 206 may determine priorities within the output data associated with the plurality of pieces of event identification information acquired from the on-board unit 100 based on the priority information associated with the event identification information. This output control unit 206 emphasizes the output mode of the output data associated with the event identification information having the high priority more than the output mode of the output data associated with the event identification information having the low priority based on the determination result of the priority.

The output control unit 206 selects event identification information having a higher priority than other event identification information based on a determination result of the priority, excludes event identification information having a lower priority than other event identification information, and sets the number of pieces of event identification information after the selection to a value less than an output limit number. The output control unit 206 causes the output data correlating with the selected event identification information to be outputted from the display unit 207 or the speaker 208.

As described above, the priority may be set in each of the event identification information and the output data. In this case, the output control unit 206 may determine priorities between output data associated with the plurality of pieces of event identification information acquired from the on-board unit 100 based on at least one of priority information associated with the event identification information and priority information associated with the output data. When the priority is determined based on both the priority information associated with the event identification information and the priority information associated with the output data, the output control unit 206 prioritizes the priority information associated with the event identification information. For example, when they have the same order, the output control unit 206 determines that the priority of the output data associated with the priority of the event identification information is higher than the priority associated with the output data.

In addition, the output control unit 206 excludes event identification information which does not satisfy the output condition associated with the event identification information in the output data table based on the current vehicle environment or the current traveling state among the event identification information input from the on-board unit 100. When the remaining number of pieces of event identification information is greater than or equal to the output limit number after the event identification information which does not satisfy the output condition is excluded, the output control unit 206 selects output data (event identification information) having a higher priority than other output data (event identification information) by referring to the priority information associated with the event identification information in the output data table, excludes output data (event identification information) having a lower priority than other output data (event identification information), and sets the number of pieces of output data (event identification information) after the selection to a value less than the output limit number. The output control unit 206 causes the selected output data (output data correlating with the event identification information) to be outputted from the display unit 207 or the speaker 208. When the number of pieces of output data is greater than or equal to the output limit number, the output control unit 206 may change the maximum number of pieces of output data capable of being simultaneously displayed on the display unit 207 without excluding the output data (event identification information) having a lower priority than the other output data (event identification information). In this case, the output control unit 206 may perform a layer display process by overlapping windows that display output data. For example, the output control unit 206 may display the window of the output data having the high priority overlapping the window of the output data having the low priority.

Specifically, when the output time condition, the weather condition, the congestion condition, etc. are associated with the event identification information in the storage unit 204, the output control unit 206 excludes event identification information for which the current vehicle environment does not satisfy at least one of the output time condition, the weather condition, and the congestion condition from among the plurality of pieces of event identification information acquired from the on-board unit 100 based on information indicating the current vehicle environment (a current time, weather, a temperature, or a congestion situation within the vehicle).

When the limited vibration condition or the limited speed condition is associated with the event identification information in the storage unit 204, the output control unit 206 excludes the event identification information for which the current traveling speed does not satisfy the limited speed condition or the event identification information for which the current vibration amount does not satisfy the limited vibration condition from among the plurality of pieces of event identification information acquired from the on-board unit 100 based on information indicating the current traveling state (traveling speed or vibration amount) received from the on-board unit 100.

That is, the output control unit 206 extracts only the event identification information matching the output condition (the output time condition, the weather condition, the congestion condition, the limited vibration condition, or the limited speed condition) associated with the event identification information from the plurality of pieces of event identification information acquired from the on-board unit 100.

The output control unit 206 may execute a process of excluding the event identification information based on the output condition as described above only when the number of pieces of event identification information acquired from the on-board unit 100 exceeds the output limit number.

When the number of pieces of extracted event identification information is greater than or equal to a predetermined output limit number, the output control unit 206 selects a number of pieces of output data within a range of the output limit number as output data to be outputted based on priority information correlating with the event identification information. Specifically, when the number of pieces of selected event identification information (for example, 5) exceeds the output limit number (for example, 2) for the display unit 207, the output control unit 206 selects two pieces of output data associated with event identification information to be preferentially outputted from among the plurality of pieces of selected event identification information.

When the number of pieces of extracted event identification information is greater than or equal to the predetermined output limit number, the output control unit 206 may limit a display region to be displayed on the display unit 207 based on priority information correlating with the event identification information. Specifically, when the number of pieces of selected event identification information (for example, 5) exceeds the output limit number for the display unit 207 (for example, 2), the output control unit 206 may set a region of output data associated with event identification information having a lower priority than the other event identification information among the plurality of pieces of selected event identification information to a small region and set a region of output data associated with event identification information having a higher priority than the other event identification information to a large region.

A process of setting the number of pieces of output data to be outputted within a range of the output limit number is executed based on the priority information only when the number of pieces of event identification information acquired from the on-board unit 100 exceeds the output limit number after a process of excluding the event identification information based on the output condition is executed in the above-described example, but the present embodiment is not limited thereto. For example, the output control unit 206 may execute the process of excluding the event identification information based on the priority information and execute the process of setting the number of pieces of output data to be outputted within the range of the output limit number based on the priority information without performing a process of excluding the event identification information based on the output condition.

The output control unit 206 outputs the output data correlating with the selected event identification information to the display unit 207 or the speaker 208.

When the output mode of the output data is determined based on information indicating at least one of the current vehicle environment and the current traveling state, the output control unit 206 performs a processing process on the output data to be outputted to the display unit 207 or the speaker 208 depending on the determined output mode.

The display unit 207, for example, is a liquid crystal display and outputs an image based on input output data. When the output control unit 206 inputs the output data on which a process of enlarging text to be displayed is performed to the display unit 207, for example, as the output mode for the congested state, the display unit 207 displays enlarged text having a size larger than a size at normal state. The display unit 207 may be mounted inside or on the outside of the vehicle.

The speaker 208 outputs sound based on the input output data. Also, for example, when the output control unit 206 inputs the output data on which the process of increasing a volume is performed to the speaker 208, for example, as the output mode for the congested state, the speaker 208 outputs the sound at a volume greater than a volume at normal state. The speaker 208 may be mounted inside or on the outside of the vehicle.

The clock unit 209 measures a current time and outputs information indicating the measured current time to the output control unit 206.

The congestion situation-monitoring server 500 includes a communication unit 501, a congestion situation analysis unit 502, and a storage unit 503.

The communication unit 501 receives on-board passenger count information which is a detection result of the boarding detector 300 and disembarking passenger count information which is a detection result of the disembarkation detector 400 from the information provision apparatus 200 via the network.

The congestion situation analysis unit 502 calculates the number of passengers on board the vehicle based on the on-board passenger count information and the disembarking passenger count information input to the congestion situation analysis unit 502 by the communication unit 501.

The storage unit 503 stores the previous number of passengers on board, for example, in association with an information provision apparatus ID.

The output data management server 600 includes an input unit 601, a setting unit 602, a storage unit 603, an update unit 604, and a communication unit 605.

The input unit 601 receives settings of positional information, an output condition, and priority information of each event.

The input unit 601 receives an input of output data for each event. The output data is data including at least one of image data and sound data.

The setting unit 602 registers the positional information, the output condition, the priority information, and the output data received by the input unit 601 in the storage unit 603 in association with the event identification information.

The storage unit 603 stores information in which the positional information, the output condition, the priority information, and the output data are associated with the event identification information.

The update unit 604 updates the event table of the on-board unit 100 at a predetermined timing. The update unit 604 updates an output data table of the information provision apparatus 200 at the predetermined timing.

The communication unit 605 is connected to the on-board unit 100 and the information provision apparatus 200 via the network.

Next, an example of an event table stored in the storage unit 105 of the on-board unit 100 will be described with reference to FIG. 3. FIG. 3 is a diagram illustrating the example of the event table according to the present embodiment.

As illustrated in FIG. 3, the event table according to the present embodiment is a table in which positional information and event identification information are associated. The associated information is information received from the output data management server 600 by the on-board unit 100. The communication unit 106 of the on-board unit 100 associates the received positional information and event identification information and writes the associated information in the event table. Also, when the communication unit 106 is a communication unit for performing short-range communication with the roadside unit (not illustrated), the on-board unit 100 may receive the positional information and the event identification information from the roadside unit (not illustrated). Also, when the on-board unit 100 does not have the communication unit 106 and is a configuration which is not connected to the network, the information provision apparatus 200 may receive the positional information associated with the event identification information from the output data management server 600 and output the received positional information to the on-board unit 100 via the connection unit 205 at a predetermined update timing. The predetermined update timing is the timing at which the information provision apparatus 200 updates the output data based on information acquired from the output data management server 600, and, for example, is the time at which the vehicle starts to travel.

Next, an example of an output data table stored in the storage unit 204 of the information provision apparatus 200 will be described with reference to FIG. 4. FIG. 4 is a diagram illustrating an example of the output data table according to the present embodiment.

As illustrated in FIG. 4, the output data table according to the present embodiment is a table in which event identification information, an output condition (an output time condition, a weather condition, a priority condition, a limited vibration condition, or limited speed information), output data, and priority information are associated. This associated information is information received from the output data management server 600 by the information provision apparatus 200. The communication unit 201 of the information provision apparatus 200 associates the received event identification information, output condition (output time condition, weather condition, priority condition, limited vibration condition, or limited speed information), output data, and priority information and writes the associated information in the output data table.

Figure 5:
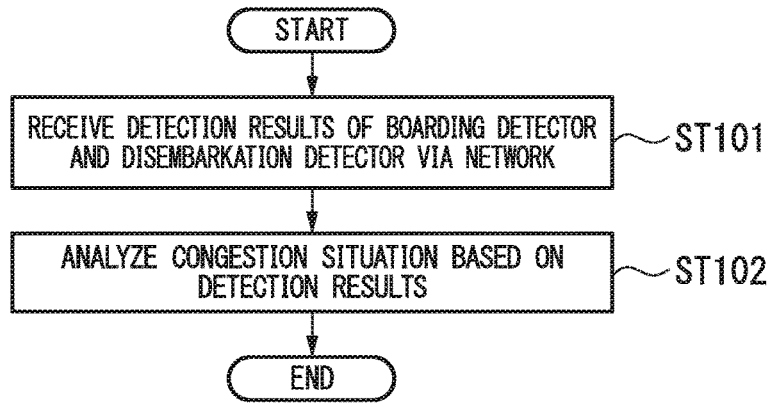
FIG. 5 is a flowchart illustrating a processing flow by a congestion situation-monitoring server according to an embodiment of the present invention.

Next, an example of a processing flow by the congestion situation-monitoring server 500 according to the present embodiment will be described with reference to FIG. 5. FIG. 5 is a flowchart illustrating the example of the processing flow by the congestion situation-monitoring server 500 according to the present embodiment.

(Step ST101)

The communication unit 501 receives on-board passenger count information which is the detection result of the boarding detector 300 and disembarking passenger count information which is the detection result of the disembarkation detector 400 from the information provision appara- tus 200 via the network. The information provision apparatus 200 associates a unique information provision apparatus ID allocated to the information provision apparatus 200 with the on-board passenger count information and the disembarking passenger count information and transmits the information provision apparatus ID associated with the on-board passenger count information and the disembarking passenger count information.

(Step ST102)

When an input of the on-board passenger count information and the disembarking passenger count information is received from the communication unit 501, the congestion situation analysis unit 502 of the congestion situation-monitoring server 500 calculates the number of passengers on board the vehicle. For example, the congestion situation analysis unit 502 calculates the number of passengers currently on board the vehicle (hereinafter referred to as the number of passengers on board) from a value obtained by subtracting the number of disembarking passengers from the number of passengers that have boarded the vehicle. When the previous number of passengers on board is stored in the storage unit 503, the congestion situation analysis unit 502 calculates the number of passengers on board by further subtracting the number of disembarking passengers from the number of persons obtained by adding the number of passengers on board to the previous number of passengers on board. The congestion situation analysis unit 502 writes information in which the calculated number of passengers on board and the information provision apparatus ID are associated to the storage unit 503 and transmits the information to the information provision apparatus 200 via the communication unit 501.

Figure 6:
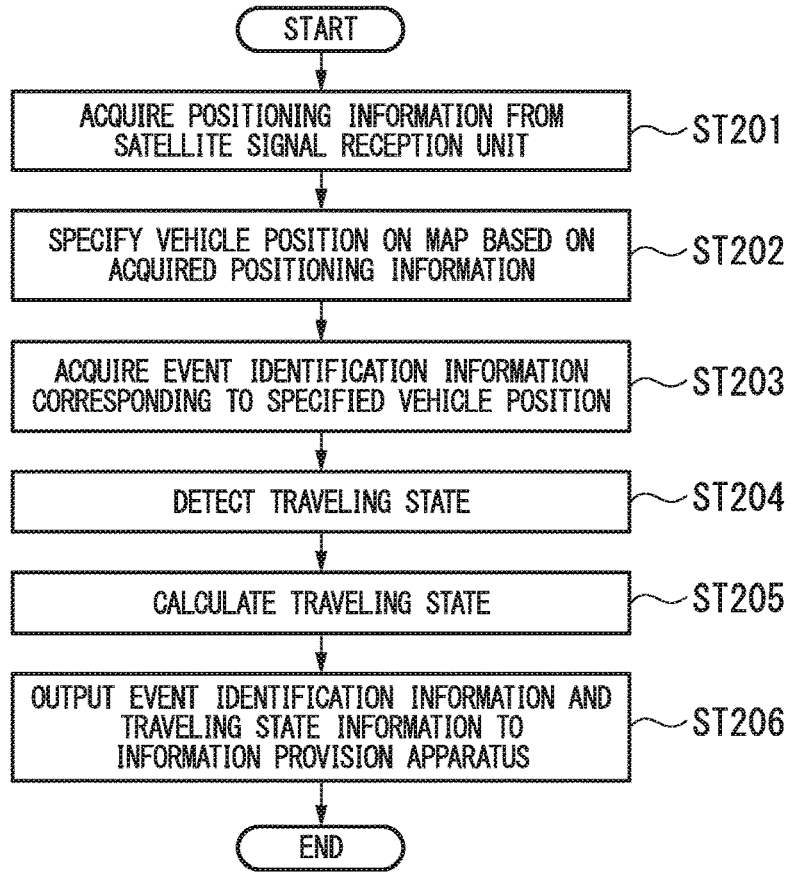
FIG. 6 is a flowchart illustrating an example of a processing flow by the on-board unit according to an embodiment of the present invention.

Next, an example of a processing flow by the on-board unit 100 according to the present embodiment will be described with reference to FIG. 6. FIG. 6 is a flowchart illustrating the example of the processing flow by the on-board unit 100 according to the present embodiment.

(Step ST201)

The satellite signal reception unit 101 receives a signal transmitted from a satellite and outputs positioning information to the position detection unit 102.

(Step ST202)

The position detection unit 102 specifies a vehicle position of a vehicle equipped with the on-board unit 100 based on the positioning information outputted from the satellite signal reception unit 101 and pre-acquired map information. For example, the position detection unit 102 specifies that the vehicle position of the vehicle is P1.

(Step ST203)

The event determination unit 103 acquires event identification information associated with positional information indicating the vehicle position P1 specified by the position detection unit 102 by referring to the storage unit 105. The event determination unit 103 acquires event identification information 001, 101, 103, 201, and 202 associated with positional information indicating the vehicle position P1 in an event table by referring to the storage unit 105.

(Step ST204)

Next, the traveling state detection sensor 107 detects a speed, acceleration, and an angular speed and outputs information indicating a detection result to the traveling state calculation unit 108.

(Step ST205)

The traveling state calculation unit 108 calculates a traveling speed of the vehicle and an amount of vibration of the vehicle based on the information indicating the speed, the acceleration, and the angular speed detected by the traveling state detection sensor 107, and outputs traveling state information which is a calculated result to the information provision apparatus 200 via the connection unit 104.

(Step ST206)

The connection unit 104 outputs the event identification information acquired by the event determination unit 103 and the traveling state information calculated by the traveling state calculation unit 108 to the information provision apparatus 200.

Figure 7:
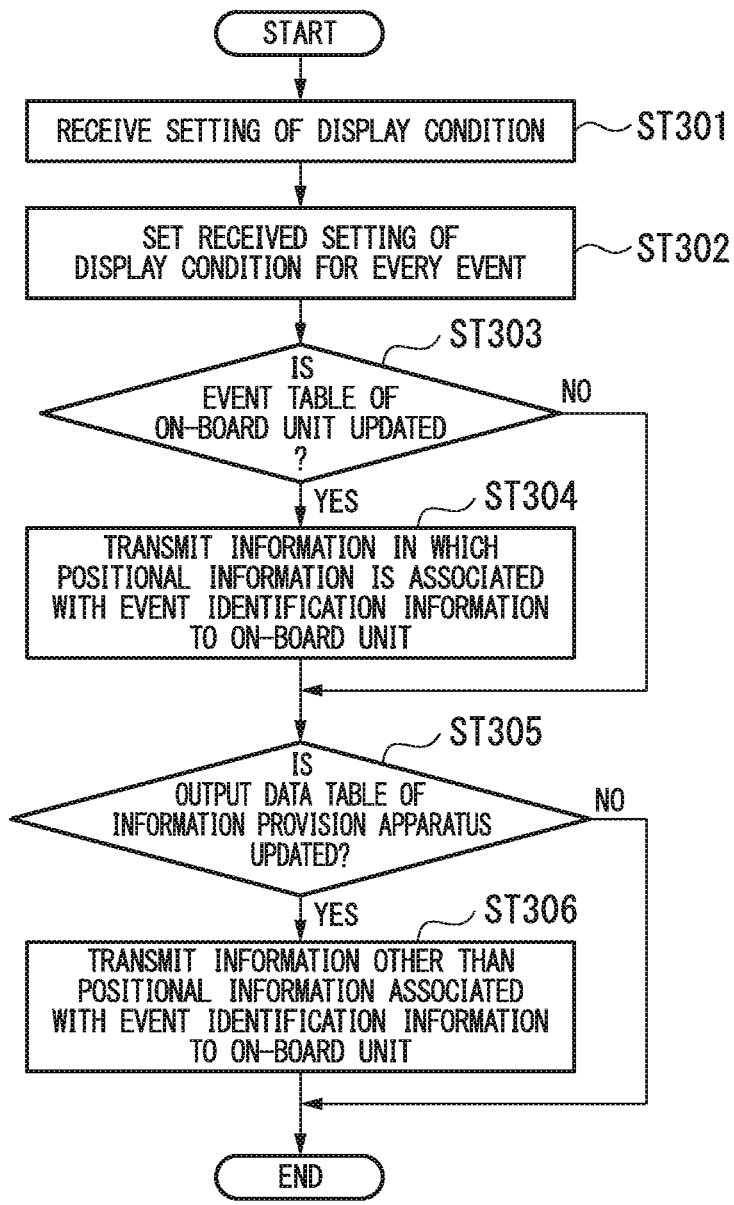
FIG. 7 is a flowchart illustrating an example of a processing flow by an output data management server according to an embodiment of the present invention.

Next, an example of a processing flow by the output data management server 600 will be described with reference to FIG. 7. FIG. 7 is a flowchart illustrating the example of the processing flow by the output data management server 600 according to the present embodiment.

(Step ST301)

The input unit 601 receives a setting of an output condition or the like for every event. For example, when the registration for a new event is indicated and output data to be outputted is set in association with positional information indicating the vehicle position P1, setting content is received and received information is outputted to the setting unit 602.

(Step ST302)

When the registration for the new event is indicated via the input unit 601, the setting unit 602, for example, issues sequential new event identification information and writes information in which the received positional information indicating the vehicle position P1 is associated with the issued new event identification information to the storage unit 603. The setting unit 602 writes the received output data to the storage unit 603 in association with the issued new event identification information. When the output time condition, the weather condition, the priority condition, the limited vibration condition, or the limited speed condition is received as the output condition in step ST301, the setting unit 602 writes the received condition to the storage unit 603 in association with the event identification information.

In addition, the setting unit 602 receives priority information correlating with the new event identification information and writes the received priority information to the storage unit 603 in association with the event identification information.

Further, the setting unit 602 writes the input output data to the storage unit 603 in association with the new event identification information.

(Step ST303)

Next, the update unit 604 determines whether to update the event table of the on-board unit 100. For example, when the positional information correlating with the new event identification information is set in steps ST301 and ST302, when a predetermined time has elapsed from a previous update time, or when information of a notification that the vehicle starts traveling is received from the information provision apparatus 200, the update unit 604 determines to update the event table of the on-board unit 100.

(Step ST304)

When the update unit 604 determines to update the event table of the on-board unit 100, the updated event identification information and positional information are read from the storage unit 603 and transmitted to the on-board unit 100 or the information provision apparatus 200 via the communication unit 605.

(Step ST305)

Next, the update unit 604 determines whether to update the output data table of the information provision apparatus 200. For example, when the positional information correlating with the new event identification information is set in steps ST301 and ST302, when the predetermined time has elapsed from the previous update time, or when the information of the notification that the vehicle starts traveling is received from the information provision apparatus 200, the update unit 604 determines to update the output data table of the information provision apparatus 200.

(Step ST306)

When the update unit 604 determines to update the output data table of the information provision apparatus 200, the updated event identification information, output data, output condition, and priority information are read from the storage unit 603 and transmitted to the information provision apparatus 200 via the communication unit 605.

In steps ST304 and ST306, the update unit 604 may read all information stored in the storage unit 603 as an update target to transmit the read information or may read only newly updated information as the update target to transmit the read information. In the latter case, the update unit 604, for example, may read only information correlating with the new event identification information set in steps ST301 and ST302 to transmit the read information or may read only information correlating with event identification information set after the previous update to transmit the read information.

Figure 8:
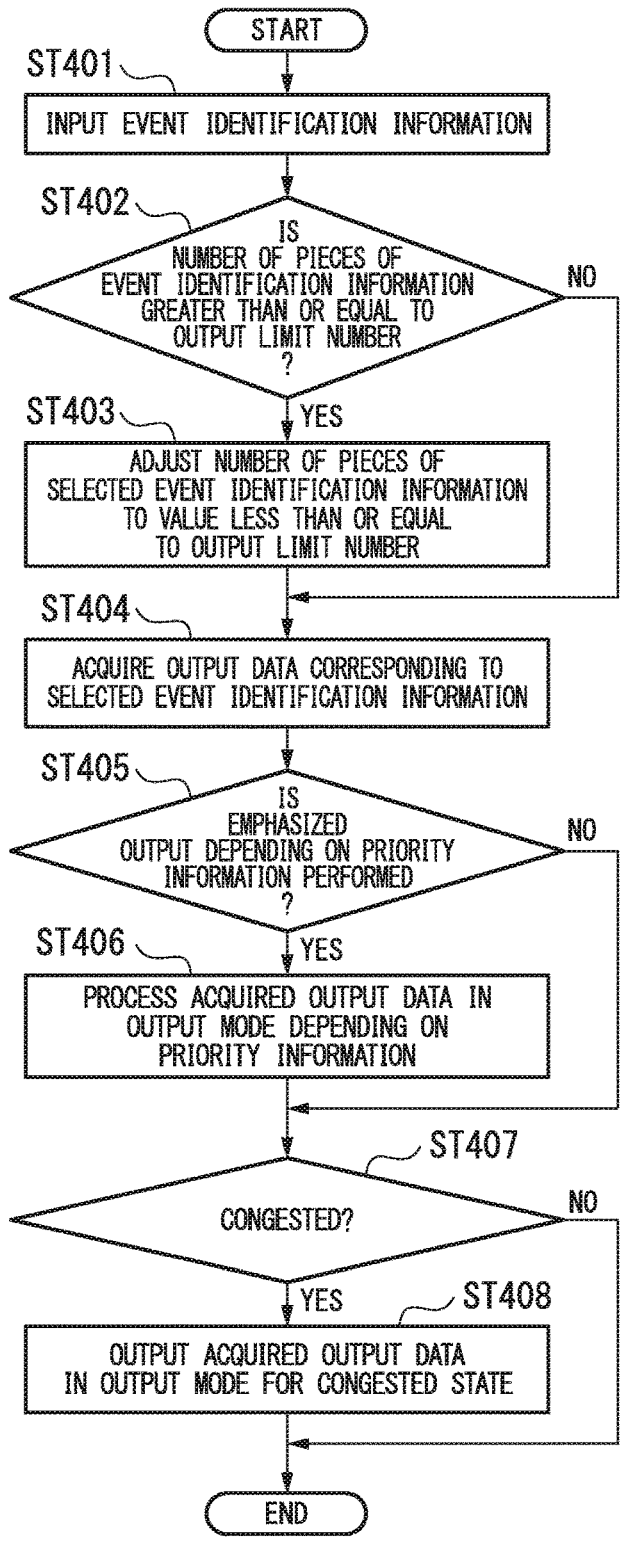
FIG. 8 is a flowchart illustrating an example of a processing flow by a vehicular information provision apparatus according to an embodiment of the present invention.

Next, an example of a processing flow by the vehicular information provision apparatus 200 according to the present embodiment will be described with reference to FIG. 8. FIG. 8 is a flowchart illustrating the example of the processing flow by the vehicular information provision apparatus 200 according to the present embodiment.

(Step ST401)

The connection unit 205 receives an input of event identification information from the on-board unit 100 and outputs the event identification information to the output control unit 206. The connection unit 205, for example, acquires a plurality of pieces of event identification information 001, 101, 103, 201, and 202 associated with positional information indicating the vehicle position P1.

(Step ST402)

The output control unit 206 determines whether the number of pieces of event identification information acquired from the on-board unit 100 is greater than or equal to the output limit number.

(Step ST403)

When it is determined that the number of pieces of event identification information acquired from the on-board unit 100 is greater than or equal to the output limit number, the output control unit 206 adjusts the number of pieces of event identification information to a value less than or equal to the output limit number as will be described below.

For example, the output control unit 206 excludes event identification information which does not match the output condition (for example, an output time condition, a weather condition, a priority condition, a limited vibration condition, a limited speed condition, or the like) set in the output data table of the storage unit 204 from the event identification information input to the output control unit 206 by the connection unit 205.

Here, when information about current weather or a temperature is registered in the storage unit 204, the output control unit 206 excludes the event identification information associated with the weather condition which does not correspond to the information about the current weather or temperature from the input event identification information 001, 101, 103, 201, and 202. For example, as illustrated in FIG. 4, a weather condition "rainy" is associated with the event identification information "101" and a weather condition "temperature of 30° C. or more" is associated with the event identification information "103." In addition, "clear" as the information about the current weather and "33° C." as the information about the current temperature are assumed to be stored in the storage unit 204. In this case, the output control unit 206 excludes the event identification information 101 associated with the weather condition which does not correspond to the information about the current weather or temperature. The output control unit 206 selects only the event identification information 001, 103, 201, and 202. When nothing is set as the weather condition in the output data table (that is, when the weather condition is not associated with the event identification information), the output control unit 206 does not exclude the event identification information 001, 201, and 202 with which the weather condition is not associated.

Likewise, the output control unit 206 excludes event identification information associated with the output time condition which does not include the current time from the input event identification information 001, 103, 201, and 202 based on the current time measured by the clock unit 209. For example, as illustrated in FIG. 4, an output time condition "6:00 to 12:00 AM" is associated with the event identification information "103," an output time condition "1:00 to 5:00 PM" is associated with the event identification information "201," and an output time condition "6:00 to 12:00 AM" is associated with the event identification information "202." The time measured by the clock unit 209 is assumed to be 10:00 AM. In this case, the output control unit 206 excludes the event identification information 201 associated with the output time condition which does not include the current time. The output control unit 206 selects only the event identification information 001, 103, and 202. When nothing is set as the output time condition in the output data table (that is, when no output time condition is associated with the event identification information), the output control unit 206 does not exclude the event identification information 001 with which the output time condition is not associated.

In addition, the output control unit 206 excludes event identification information associated with priority information which does not correspond to a priority condition based on the priority information associated with the event identification information acquired from the on-board unit 100 in the output data table. For example, a priority condition "exclusion when there is event identification information having a highest priority" is assumed to be set in the event identification information. In this case, the output control unit 206 excludes the event identification information associated with the priority condition "exclusion when there is event identification information having a highest priority" when there is event identification information associated with priority information "highest priority" among a plurality of pieces of event identification information acquired from the on-board unit 100 regardless of priorities between a plurality of pieces of output data (event identification information) acquired from the on-board unit 100.

Further, the output control unit 206 excludes event identification information for which the traveling state does not correspond to the limited vibration condition or the limited speed condition based on the traveling state information input to the output control unit 206 by the on-board unit 100. For example, a limited vibration condition "threshold value 1" is assumed to be set in the event identification information. In this case, when an amount of vibration indicated by the traveling state information acquired from the on-board unit 100 exceeds the threshold value 1, the output control unit 206 excludes the event identification information associated with the limited vibration condition "threshold value 1." For example, a limited speed condition "20 km per hour" is assumed to be set in the event identification information.

In this case, when a traveling speed indicated by the traveling state information acquired from the on-board unit 100 exceeds 20 km per hour, the output control unit 206 excludes the event identification information associated with the limited speed condition "20 km per hour."

When the output control unit 206 determines that the number of pieces of event identification information acquired from the on-board unit 100 exceeds the output limit number as described above, the number of pieces of event identification information can be set to be less than the output limit number by excluding event identification information which does not correspond to the output condition.

The present embodiment is not limited thereto, but the output control unit 206 may select event identification information equal in number to the output limit number in descending order of priority by referring to the priority information associated with the output data (event identification information) in the output data table when it is determined that the number of pieces of event identification information acquired from the on-board unit 100 is greater than or equal to the output limit number and set the number of pieces of event identification information after the selection to a value less than the output limit number.

The present embodiment is not limited thereto, but the output control unit 206 may select event identification information equal in number to the output limit number in descending order of priority by referring to the priority information associated with the output data (event identification information) in the output data table when it is determined that the number of pieces of event identification information correlating with the output condition is greater than or equal to the output limit number and set the number of pieces of event identification information after the selection to a value less than the output limit number.

In the present embodiment, for example, output limit number=2 is assumed to be determined. Consequently, the output control unit 206 determines that the number of pieces of event identification information 001, 103, and 202 correlating with the output condition exceeds the output limit number.

Therefore, the output control unit 206 selects event identification information having a highest priority, that is, the event identification information "001" with which the "highest priority" is associated as the priority information, as event identification information to be prioritized.

Next, the output control unit 206 compares priority information "priority higher than that of university advertisement" of the event identification information "103" with priority information of the event identification information "202." Here, no priority information is set in the event identification information "202," but the priority information "priority higher than that of university advertisement" is set in the event identification information "103." Consequently, the output control unit 206 determines that the event identification information "103" has a higher priority than the event identification information "202" and is event identification information to be prioritized, and selects the event identification information "103."

Here, a condition to be prioritized is set by limiting a target as in "priority higher than that of university advertisement" as the priority information, but the present embodiment is not limited thereto. Order information indicating a priority or a value (priority level) indicating a priority degree may be associated as the priority information.

(Step ST404)
The output control unit 206 selects the event identification information acquired from the on-board unit 100 or the event identification information which is not excluded in step ST403 and causes output data correlating with the selected event identification information to be outputted from the output unit (the display unit 207 or the speaker 208).

(Step ST405)
Next, the output control unit 206 determines whether emphasized output according to the priority information is set.

(Step ST406)
When cooperative output depending on priority information is set, the output control unit 206 emphasizes the output mode of output data (output data associated with event identification information) having a high priority more than the output mode of output data (output data associated with event identification information) having a low priority based on the priority information associated with the output data (event identification information) by referring to the event table.

For example, the output control unit 206 allocates a largest region when a display screen of the display unit 207 is divided into three as a display region of output data correlating with event identification information having a highest priority, that is, event identification information "001" with which the "highest priority" is associated as the priority information.

Next, the output control unit 206 compares the priority information "priority higher than that of university advertisement" of the event identification information "103" with the priority information of the event identification information "202" and allocates a second largest region when the display screen of the display unit 207 is divided into three as the display region of the output data correlating with the event identification information "103." The output control unit 206 allocates the third largest region when the display screen of the display unit 207 is divided into three as the display region of the output data correlating with the event identification information "202."

(Step ST407)
Next, the congestion situation determination unit 203 determines whether the inside of the vehicle is currently congested based on congestion information input to the congestion situation determination unit 203 by the congestion information acquisition unit 202. The congestion situation determination unit 203 may perform a determination process to determine whether the inside of the vehicle is congested at the timing at which an input of a command for requesting a determination of the congestion information is received from the output control unit 206. At a timing at which the information provision apparatus 200 receives event identification information or a periodic timing, the determination process of whether the inside of the vehicle is congested may be performed.

(Step ST408)
When the congestion situation determination unit 203 determines that the inside of the vehicle is currently congested, the output control unit 206 performs a process depending on the output mode for the congested state on the output data acquired in step ST405. In this case, the display unit 207 enlarges text included in an image of corporate advertisement 3 to a size larger than a normal size to display the enlarged text and outputs sound of corporate advertisement 3 at a volume greater than a normal volume.

On the other hand, when the congestion situation determination unit 203 determines that the inside of the vehicle is currently not congested, the output control unit 206 does not perform a process depending on the output mode for the congested state on the output data acquired in step ST405. In this case, the display unit 207 displays text included in an image of corporate advertisement 3 in the normal size and the speaker 208 outputs sound of corporate advertisement 3 at the normal volume.

According to the vehicular information provision system according to the present embodiment as described above, event identification information for identifying a predetermined event depending on a position on a map is commonly used between apparatuses, so that the on-board unit 100 may perform only a process of finding event identification information correlating with the detected positional information and transmitting the found event identification information to the information provision apparatus 200. Consequently, it is possible to reduce a processing load of the on-board unit 100 and use the simple on-board unit 100 in the vehicular information provision system for outputting information depending on a position on a map from the information provision apparatus 200. Accordingly, because the simple on-board unit 100 which is widely used in circular buses can be used, it is possible to suppress cost when the vehicular information provision system is implemented.

In addition, the information provision apparatus 200 is able to output latest output data sequentially added to the information provision apparatus 200 by commonly employing event identification information for identifying a predetermined event depending on a position on a map between apparatuses and updating information stored in the on-board unit 100 and the information provision apparatus 200 using information correlating with the event identification information added to the output data management server 600.

The vehicular information provision system according to the present embodiment is not limited to the above, but may provide the following information.

For example, as disclosed in the output data table illustrated in FIG. 4, output data "bump warning" associated with event identification information of a place in which there is a bump or output data "sharp curve warning" associated with the event identification information of a place in which there is a sharp curve is outputted from the information provision apparatus 200, so as to be able to call a driver's attention to driving and call a passenger's attention. Thereby, the vehicular information provision system is able to call the attention of both the driver and the passenger during traveling in a dangerous place.

In addition, as disclosed in the output data table illustrated in FIG. 4, output data "station pass notification" associated with the event identification information of a place in which there is a station is outputted from the information provision apparatus 200, so that the passenger is notified when a station is passed. Also, output data "station approach notification" associated with event identification information of a place before a place in which there is a station is outputted from the information provision apparatus 200, so that both the driver and the passenger may be notified of the fact that they are approaching the station.

Further, as disclosed in the output data table illustrated in FIG. 4, the limited vibration condition (threshold values 1 and 2) or the limited speed condition (20 km per hour) is set in the event identification information of a place in which there is a bump or a sharp curve, so that the output data associated with the event identification information may be outputted only when the amount of vibration indicated by the traveling state information acquired from the on-board unit 100 exceeds the threshold values 1 and 2 of the limited vibration condition or when the traveling speed indicated by the traveling state information acquired from the on-board unit 100 exceeds 20 km per hour in the limited speed condition.

In addition, when the output control unit 206 adjusts the number of pieces of event identification information in step ST403 of FIG. 8, at least one of a process of excluding event identification information which does not correspond to the output condition and a process of excluding output data (event information) having a low priority from among output data correlating with a plurality of pieces of event identification information acquired from the on-board unit 100 based on priority information may be executed.

Further, when the output control unit 206 determines that the remaining number of pieces of event identification information is greater than or equal to the output limit number after the event identification information which does not correspond to the output condition is excluded, a display region displayed on the display unit 207 may be limited.

For example, the output control unit 206 allocates a largest region when a display screen of the display unit 207 is divided into three as a display region of output data correlating with event identification information having a highest priority, that is, event identification information "001" with which a "highest priority" is associated as the priority information. Next, the output control unit 206 compares the priority information "priority higher than that of university advertisement" of the event identification information "103" with the priority information of the event identification information "202" and allocates a second largest region when the display screen of the display unit 207 is divided into three as the display region of the output data correlating with the event identification information "103." The output control unit 206 allocates the third largest region when the display screen of the display unit 207 is divided into three as the display region of the output data correlating with the event identification information "202."

A process may be executed by recording a program for implementing the functions of the information provision apparatus 200 on a computer-readable recording medium and causing a computer system to read and execute the program recorded on the recording medium. The "computer system" used here is assumed to include an operating system (OS) and hardware such as peripheral devices. In addition, the computer system is assumed to include a World Wide Web (WWW) system having a homepage-providing environment (or displaying environment). In addition, the "computer-readable recording medium" refers to a storage apparatus including a flexible disk, a magneto-optical disc, a read only memory (ROM), or a portable medium such as a compact disc (CD)-ROM, and a hard disk embedded in the computer system. Furthermore, the "computer-readable recording medium" is assumed to include a medium that holds a program for a constant period of time, such as a volatile memory (random access memory (RAM)) inside a computer system serving as a server or a client when the program is transmitted via a network such as the Internet or a communication circuit such as a telephone circuit.

In addition, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. In addition, the above-described program may be a program for implementing some of the above-described functions. Further, the above-described program may be a program, i.e., a so-called differential file (differential program), capable of implementing the above-described function in combination with a program already recorded on the computer system.

INDUSTRIAL APPLICABILITY

The present invention relates to a vehicular information provision system for providing information to at least one of the inside and outside of a traveling vehicle, the vehicular information provision system including: a server configured to associate output data outputted from the vehicle and event identification information for identifying a predetermined event depending on a position on a map and hold the associated output data and event identification information; an on-board unit which is to be mounted on the vehicle and configured to specify a vehicle position based on positioning information acquired by a satellite-positioning system and pre-acquired map information and output the event identification information correlating with the specified vehicle position; and an information provision apparatus which is to be mounted on the vehicle and configured to acquire the output data correlating with the event identification information acquired from the on-board unit from the server and cause the output data to be outputted from an output unit.

According to the present invention, it is possible to reduce a processing load on an on-board unit and rapidly update sequentially added provision information to provide the updated information in a vehicle.

REFERENCE SIGNS LIST

1 On-board unit
200 Information provision apparatus
300 Boarding detector
400 Disembarkation detector
500 Congestion situation-monitoring server
600 Output data management server
101 Satellite signal reception unit
102 Position detection unit
103 Event determination unit
104 Connection unit
105 Storage unit
106 Communication unit
107 Traveling state detection sensor
108 Traveling state calculation unit
201 Communication unit
202 Congestion information acquisition unit
203 Congestion situation determination unit
204 Storage unit
205 Connection unit
206 Output control unit
207 Display unit
208 Speaker
209 Clock unit
501 Communication unit
502 Congestion situation analysis unit
503 Storage unit
601 Input unit
602 Setting unit
603 Storage unit
604 Update unit
605 Communication unit

The invention claimed is:

1. A vehicular information provision system for providing information to at least one of the inside and outside of a traveling vehicle, the vehicular information provision system comprising:
 a server configured to associate output data outputted from the vehicle and event identification information for identifying a predetermined event depending on a position on a map and hold the associated output data and event identification information;
 an on-board unit which is to be mounted on the vehicle and configured to specify a vehicle position based on positioning information acquired by a satellite-positioning system and pre-acquired map information and output the event identification information correlating with the specified vehicle position; and
 an information provision apparatus which is to be mounted on the vehicle and configured to select a plurality of event identification information associated with a current vehicle environment including at least one of weather at the vehicle position and a congestion situation in the vehicle among the event identification information acquired from the on-board unit from the server, acquire a plurality of the output data correlating with the respective selected event identification information and cause the plurality of output data to be outputted from an output unit,
 wherein the plurality of output data includes a first output data provided only to a service user of the vehicle and a second output data provided to both the service user of the vehicle and the service provider of the vehicle.

2. The vehicular information provision system according to claim 1, wherein the information provision apparatus further includes an output control unit configured to determine an output mode of the output data correlating with the event identification information acquired from the on-board unit based on information indicating at least one of a current vehicle environment and a current traveling state.

3. The vehicular information provision system according to claim 2,
 wherein the information provision apparatus further includes a congestion situation determination unit configured to determine a congestion situation within the vehicle based on congestion information about a degree of congestion within the vehicle, and
 wherein the output control unit of the information provision apparatus emphasizes an output mode of the output data when the inside of the vehicle is congested more than an output mode of the output data when the inside of the vehicle is not congested based on a determination result of the congestion situation.

4. The vehicular information provision system according to claim 2, wherein the output control unit of the information provision apparatus determines priorities between the output data associated with the plurality of pieces of event identification information acquired from the on-board unit based on predetermined priority information in association with the event identification information and emphasizes an output mode of the output data having a high priority more than an output mode of the output data having a low priority.

5. The vehicular information provision system according to claim 2, wherein the output control unit of the information provision apparatus limits an output of the output data correlating with the event identification information having a lower priority than other event identification information among the event identification information acquired from the on-board unit based on priority information predetermined in association with the event identification information.

6. The vehicular information provision system according to claim 2, wherein the output control unit of the information provision apparatus compares an output condition predetermined in association with the event identification information with the current vehicle environment or the current traveling state and causes the output data correlating with the remaining event identification information obtained by excluding the event identification information for which the current vehicle environment or the current traveling state does not satisfy the output condition among the event identification information acquired from the on-board unit to be outputted from the output unit.

7. The vehicular information provision system according to claim 1, wherein the output data includes at least one of image data and sound data.

8. The vehicular information provision system according to claim 1, wherein the information provision apparatus is configured to further select event identification information associated with a current traveling state including at least one of traveling speed of the vehicle and vibration amount within the vehicle among the event identification information acquired from the on-board unit from the server.

9. A vehicular information provision method of providing information to at least one of the inside and outside of a traveling vehicle, the vehicular information provision method comprising:
specifying, by an on-board unit mounted on the vehicle, a vehicle position based on positioning information acquired by a satellite-positioning system and pre-acquired map information and output the event identification information correlating with the specified vehicle position;
selecting, by an information provision apparatus mounted on the vehicle, a plurality of event identification information associated with a current vehicle environment including at least one of weather at the vehicle position and a congestion situation in the vehicle among the event identification information acquired from the on-board unit from the server, which associates the output data outputted from the vehicle and event identification information for identifying a predetermined event depending on a position on a map and holds the associated output data and event identification information; and
acquiring a plurality of output data correlating with the respective selected event identification information; and
causing the plurality of output data to be outputted from an output unit,
wherein the plurality of output data includes a first output data provided only to a service user of the vehicle and a second output data provided to both the service user of the vehicle and the service provider of the vehicle.

10. A non-transitory computer-readable medium storing a program for causing a computer, which is mounted in a traveling vehicle and provides information to at least one of the inside and outside of the vehicle, to execute the steps of:
acquiring event identification information correlating with a vehicle position specified based on positioning information acquired by a satellite-positioning system and pre-acquired map information from an on-board unit;
selecting a plurality of event identification information associated with a current vehicle environment including at least one of weather at the vehicle position and a congestion situation in the vehicle among the event identification information acquired from the on-board unit from a server, which associates output data outputted from the vehicle and event identification information for identifying a predetermined event depending on a position on a map and holds the associated output data and event identification information;
acquiring a plurality of output data correlating with the selected event identification; and
causing the plurality of output data to be outputted from an output unit,
wherein the plurality of output data includes a first output data provided only to a service user of the vehicle and a second output data provided to both the service user of the vehicle and the service provider of the vehicle.

* * * * *